(12) United States Patent
Arai (10) Patent No.: US 7,701,674 B2
(45) Date of Patent: Apr. 20, 2010

(54) HEAD SUSPENSION WITH MULTILAYER GROUND, FLEXURE WITH MULTILAYER GROUND, AND METHODS OF MANUFACTURING THEM

(75) Inventor: Hajime Arai, Aikoh-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 749 days.

(21) Appl. No.: 11/636,251

(22) Filed: Dec. 8, 2006

(65) Prior Publication Data

US 2007/0133128 A1 Jun. 14, 2007

(30) Foreign Application Priority Data

Dec. 9, 2005 (JP) .............................. 2005-357046

(51) Int. Cl.
G11B 5/48 (2006.01)
G11B 21/16 (2006.01)

(52) U.S. Cl. .................................. 360/245.9; 360/245.3

(58) Field of Classification Search .............. 360/245.3, 360/245.8, 245.9, 246
See application file for complete search history.

(56) References Cited

U.S. PATENT DOCUMENTS

| | | | | |
|---|---|---|---|---|
| 5,717,547 A | * | 2/1998 | Young | 360/246 |
| 5,737,152 A | * | 4/1998 | Balakrishnan | 360/245.9 |
| 5,995,328 A | * | 11/1999 | Balakrishnan | 360/245.9 |
| 5,995,329 A | * | 11/1999 | Shiraishi et al. | 360/245.9 |
| 6,493,190 B1 | * | 12/2002 | Coon | 360/245.9 |
| 6,608,736 B1 | * | 8/2003 | Klaassen et al. | 360/246 |
| 6,762,913 B1 | * | 7/2004 | Even et al. | 360/246 |
| 6,900,967 B1 | * | 5/2005 | Coon et al. | 360/245.9 |
| 2006/0218772 A1 | * | 10/2006 | Yao et al. | 29/603.03 |

FOREIGN PATENT DOCUMENTS

| | | |
|---|---|---|
| JP | 2003-249046 | 9/2003 |
| JP | 2005071539 A * | 3/2005 |

\* cited by examiner

Primary Examiner—William J Klimowicz
(74) Attorney, Agent, or Firm—Jordan and Hamburg LLP (57) ABSTRACT

A head suspension includes a load beam to apply load onto a head that writes and reads information to and from the hard disk and a flexure attached to the load beam and supporting the head. The flexure has write wires and read wires connected to the head. The flexure includes a substrate made of a conductive thin plate, a base insulating layer made of flexible resin and formed on the substrate, and the wires are arranged on the base insulating film. A ground layer is formed at least partly between the substrate and the base insulating layer. The ground layer only corresponds to the write wires in a width direction of the flexure. The conductivity of the ground layer is higher than that of the substrate that is made of a conductive thin plate.

14 Claims, 9 Drawing Sheets

(a) Substrate forming process (b) High-conductivity ground layer forming process (c) Base insulating layer forming process (d) Wiring forming process (e) Cover insulating layer forming process (f) Window forming process

HEAD SUSPENSION WITH MULTILAYER GROUND, FLEXURE WITH MULTILAYER GROUND, AND METHODS OF MANUFACTURING THEM

BACKGROUND OF THE INVENTION

1. Field of the Invention

The present invention relates to a head suspension in a hard disk drive incorporated in an information processing apparatus such as a computer. In particular, the present invention relates to a head suspension with a multilayer ground, a method of manufacturing the same, a flexure with a multilayer ground, and a method of manufacturing the same.

2. Description of Related Art

A head suspension used for a hard disk drive (HDD) has a flexure. According to a related art, the flexure has a four-layer structure including a substrate made of a resilient stainless steel thin plate, a base insulating layer made of flexible resin and covering the substrate, write (record) and read (reproduce) signal wiring formed on the base insulating layer and connected to a magnetic head, and a cover insulating layer made of flexible resin and covering the wiring.

According to the related art, write and read signals transmitted through the head suspension use the stainless-steel substrate of the flexure as an electrical ground. The stainless-steel substrate has a low conductivity, which is about $1/50$ of that of copper. Due to this, the stainless-steel substrate causes a large signal transmission loss (hereinafter referred to simply as "loss" or "transmission loss") and a narrow frequency band.

To cope with this, there is a known technique to arrange a copper ground layer between the stainless-steel substrate and the base insulating layer, to lower a wiring impedance, decrease the loss, and widen the frequency band.

The wiring impedance must be low on the write (record) side to minimize the loss and widen the frequency band. On the other hand, the wiring impedance must be high on the read (reproduce) side to increase an input impedance at a preamplifier, to expand a voltage signal to the preamplifier.

If the copper ground layer is arranged to entirely cover the width of the stainless-steel substrate, the wiring impedance on the read side is decreased. Namely, the related art is unable to lower wiring impedance on the write side, and at the same time, increase wiring impedance on the read side.

The above-mentioned related art is disclosed in, for example, Japanese Unexamined Patent Application Publication No. 2003-249046.

SUMMARY OF THE INVENTION

An object of the present invention is to realize a low wiring impedance, a low transmission loss, and a wide frequency band on the write side of a head suspension, and at the same time, a high wiring impedance, a low transmission loss, and a wide frequency band on the read side of the head suspension.

In order to simultaneously realize a low wiring impedance, a low transmission loss, and a wide frequency band on the write side of a head suspension and a high wiring impedance, a low transmission loss, and a wide frequency band on the read side of the head suspension, an aspect of the present invention forms a ground layer having a higher conductivity than a substrate of a flexure of the head suspension between the substrate and a base insulating layer of the flexure only on the write wiring side in a widthwise direction of the flexure.

According to this aspect of the present invention, the ground layer having a higher conductivity than the substrate is formed between the substrate and the base insulating layer only on the write wiring side of the flexure. This aspect can simultaneously realize a low wiring impedance, a low transmission loss, and a wide frequency band on the write side of the head suspension and a high wiring impedance, a low transmission loss, and a wide frequency band on the read side of the head suspension.

In this way, the present invention partially arranges a high-conductivity ground layer in a head suspension of a hard disk drive, to simultaneously realize a low wiring impedance, a low transmission loss, and a wide frequency band on the write side of the head suspension and a high wiring impedance, a low transmission loss, and a wide frequency band on the read side of the head suspension.

DETAILED DESCRIPTION OF EMBODIMENTS

A head suspension with a multilayer ground according to the first embodiment of the present invention will be explained.

Figure 1:
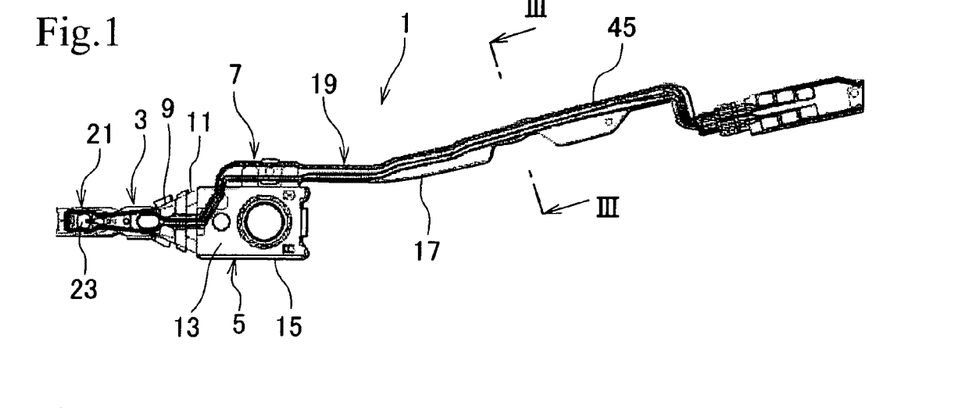
FIG. 1 is a plan view showing a head suspension according to a first embodiment of the present invention.
Figure 2:
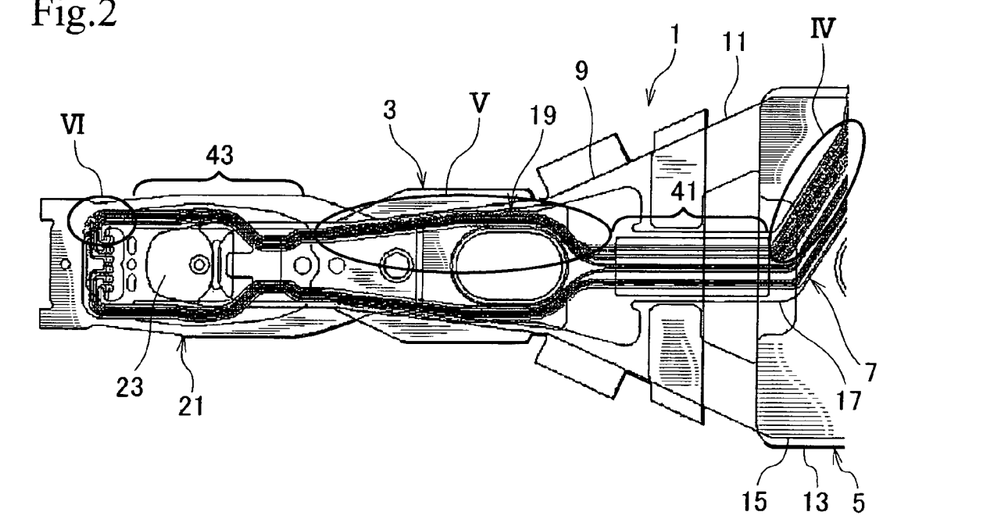
FIG. 2 is an enlarged plan view showing a part of the head suspension according to the first embodiment.

FIG. 1 is a plan view showing the head suspension according to the first embodiment and FIG. 2 is an enlarged plan view showing the same.

In FIGS. 1 and 2, the head suspension 1 with a multilayer ground includes a load beam 3, a base 5, and a flexure 7.

The load beam 3 applies load onto a head 21 and has a rigid part 9 and a resilient part 11. The rigid part 9 is made of, for example, stainless steel and is relatively thick. The thickness of the rigid part 9 is, for example, about 100 μm.

The resilient part 11 is a discrete part separately formed from the rigid part 9. The resilient part 11 is made from, for example, a resilient thin stainless steel rolled plate and has a precision spring constant that is lower than that of the rigid part 9. The thickness of the resilient part 11 is, for example, about 40 μm. A first end of the resilient part 11 is fixed to a rear end of the rigid part 9 by, for example, laser welding. A second end of the resilient part 11 is integral with a reinforcing plate 13.

The base 5 has a base plate 15. The base plate 15 is laid over the reinforcing plate 13 and is fixed thereto by, for example, laser welding.

The base plate 15 is strengthened with the reinforcing plate 13, to form the base 5. The base 5 is attached to an arm of a carriage of a hard disk drive, so that the head suspension may turn around a spindle.

The flexure 7 includes a substrate 17 that is made of a conductive thin plate having a thickness of about 15 to 30 μm. The conductive thin plate serves as a ground and is, for example, a resilient thin stainless steel rolled plate (SST). On the substrate 17, an electric insulating layer 33 to be explained later is formed. On the insulating layer 33, wiring 19 is formed. The flexure 7 is fixed to the rigid part 9 by, for example, laser welding. The wiring 19 extends from the flexure 7 to pass through the resilient part 11 and the base 5. An end of the wiring 19 is conductively connected to a write (record) terminal and a read (reproduce) terminal of the head 21. The other end of the wiring 19 is led to rearward of the base 5.

The head 21 has a cantilevered tongue 23 of the flexure 7. The tongue 23 has a write slider and a read slider. The sliders have terminals that are connected to a write (record) element and a read (reproduce) element, which are connected to the write and read terminals.

The write element is, for example, a standard induction type magnetic transducer. The read element is an MR element, a GMR element, or a TuMR element having a high read/write sensitivity.

Figure 3:
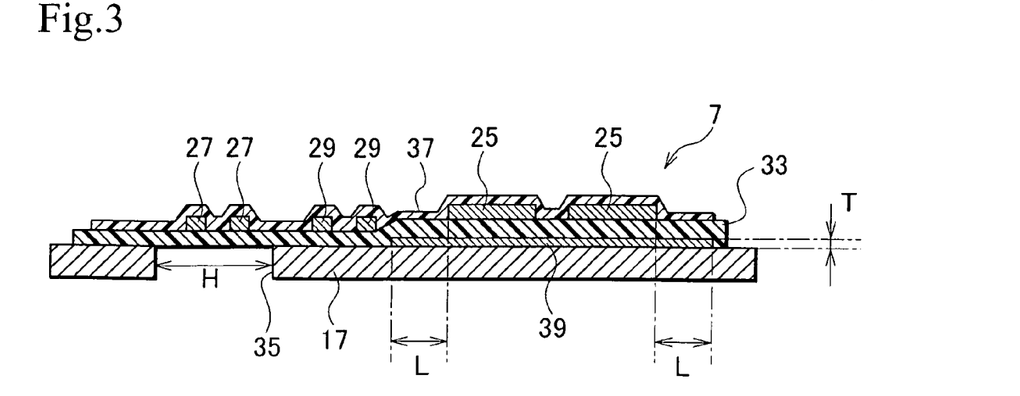
FIG. 3 is a sectional view taken along a line III-III of FIG. 1.
Figure 4:
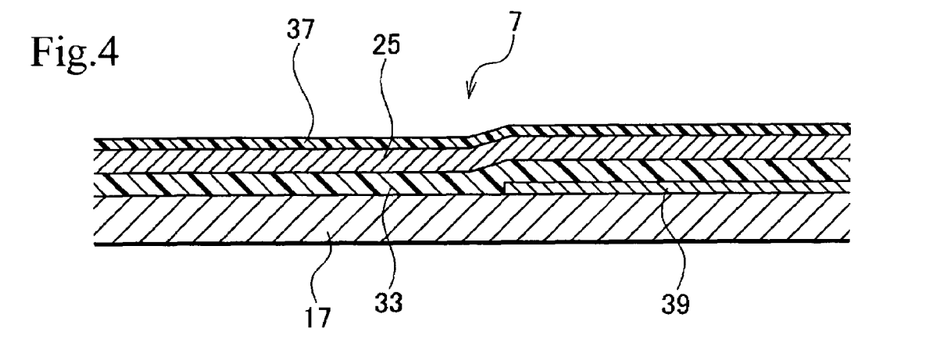
FIG. 4 is a sectional view taken at a part IV of FIG. 2 in a flexure extending direction.

FIG. 3 is an enlarged sectional view of the flexure 7 taken along a line III-III of FIG. 1 and FIG. 4 is a sectional view taken along a part IV of FIG. 2 in a flexure extending direction.

As shown in FIGS. 1 to 3, the wiring pattern 19 includes write (record) wires 25 (W1, W2) and read (reproduce) wires 27 (R1, R2). According to this embodiment, heat wires 29 are also arranged to heat the head 21 and adjust a floating gap.

The write wires 25, read wires 27, and heat wires 29 are arranged on the base insulating layer 33 made of flexible resin that is formed on the substrate 17 of the flexure 7. The substrate 17 has a through window 35 having a width H. The window 35 is to increase an impedance of the read side, and therefore, is arranged so as to correspond to the read wires 27. According to this embodiment, the window 35 is formed under the read wires 27. The window 35 is formed at a proper location along the read wires 27 in the extending direction of the flexure 7.

The write wires 25 are wider than the read wires 27, to realize a lower impedance.

The base insulating layer 33 is made of flexible insulating resin such as polyimide and has a thickness of about 5 to 20 μm.

The write wires 25 and read wires 27 arranged on the base insulating layer 33 are covered with a cover insulating layer 37. The cover insulating layer 37 is made of flexible insulating resin such as polyimide and has a thickness of about 5 to 20 μm. The cover insulating layer 37 covers the surfaces of the wires 25, 27, and 29 and protects them from external force and the like.

A high-conductivity ground layer 39 is formed at least partly between the substrate 17 and the base insulating layer 33 in a thickness direction of the flexure 7. The ground layer 39 only corresponds to the write wires 25 in a width direction of the flexure 7. The conductivity of the ground layer 39 is higher than that of the substrate 17 that is made of a conductive thin plate. According to this embodiment, the ground layer 39 is made by copper plating and has a thickness equal to or larger than 3 μm. For example, the thickness T of the ground layer 39 is in the range of 5 to 10 μm.

According to the first embodiment, the width of the ground layer 39 exceeds the width of the write wires 25. Namely, each edge of the ground layer 39 protrudes from a corresponding edge of the write wires 25 toward an outer side by a distance L. The distance L is in the range of, for example, 20 to 100 μm. Instead, each edge of the ground layer 39 may agree with a corresponding edge of the write wires 25, or may be inwardly retracted therefrom. The ground layer 39 may be extended to the area of the heat wires 29 unless the impedance of the read wires 27 is decreased.

The ground layer 39 is formed to an extent not to affect the movement characteristic of the head 21 with respect to a hard disk. The extent not to affect the movement characteristic of the head 21 is an extent not to affect the stiffness or mechanical characteristic of the head suspension 1. More precisely, the ground layer 39 must not be formed in a zone 41 around the resilient part 11 that resiliently supports the load beam 3 with respect to the base 5 and in a zone around an outrigger 43 of the flexure 7. According to this embodiment, the ground layer 39 is formed in a tail zone 45 (FIGS. 1 and 4) of the flexure 7 including the part IV (FIG. 2), as well as in parts V and VI (FIG. 2). The ground layer 39 may be formed only in the tail zone 45 that mainly determines the electric characteristic of the flexure 7 and may not be formed in the parts V and VI.

A method of manufacturing the head suspension 1 according to the first embodiment will be explained with reference to the flowchart of FIG. 5 and the sectional views of FIGS. 6(a) to 6(f).

Figure 5:
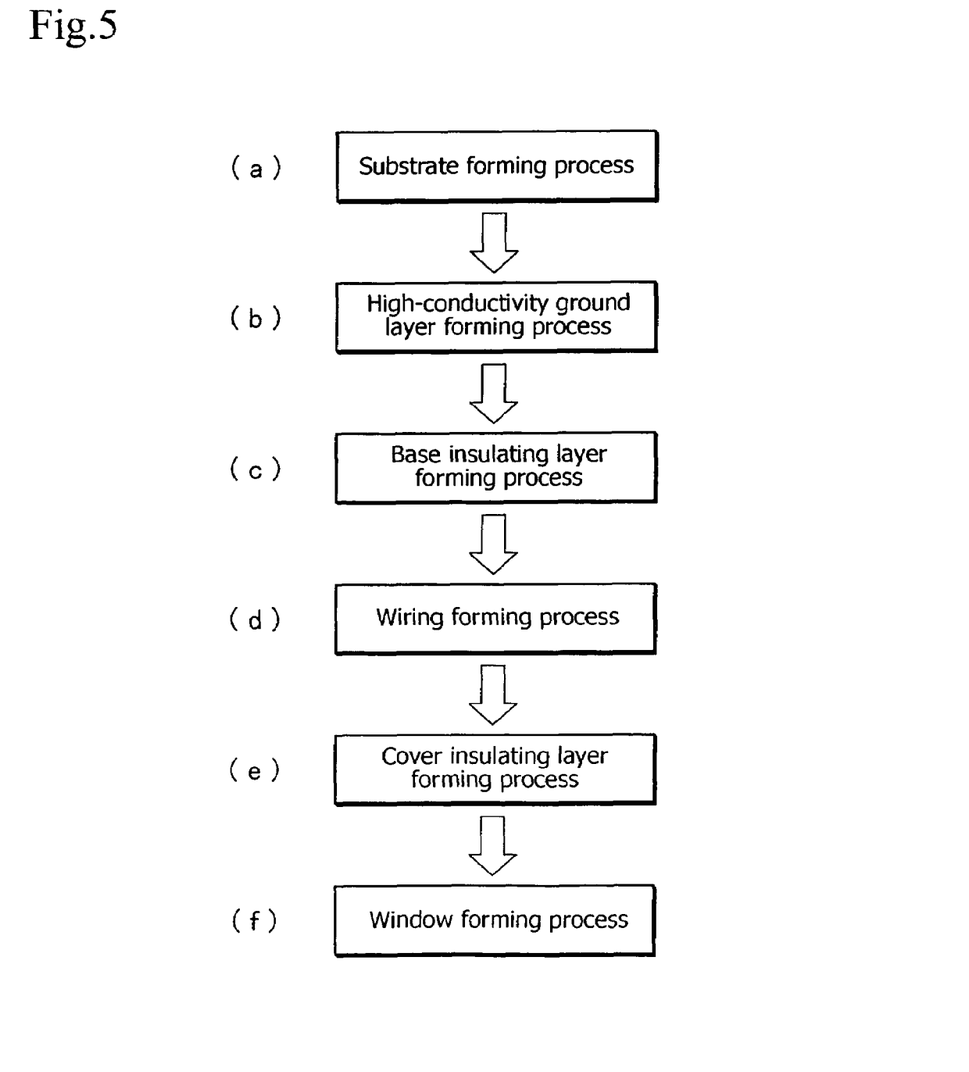
FIG. 5 is a flowchart showing a method of manufacturing the head suspension according to the first embodiment.

The flexure 7 of the first embodiment is manufactured through a substrate forming process (a), a high-conductivity ground layer forming process (b), a base insulating layer forming process (c), a wiring forming process (d), a cover insulating layer forming process (e), and a window forming process (f) shown in FIG. 5.

Figure 6A:
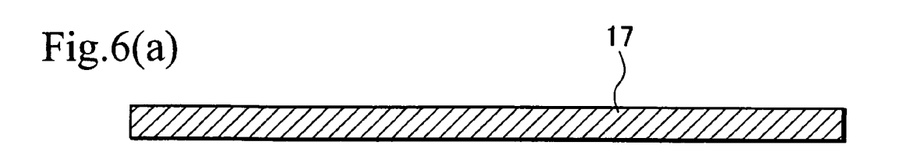
FIGS. 6(a) to 6(f) are sectional views showing the method of manufacturing the head suspension according to the first embodiment.

The substrate forming process (a) of FIG. 5 processes a stainless steel rolled plate having a thickness of 15 to 30 μm by etching or pressing into the substrate 17 shown in FIG. 6(a).

Figure 6B:
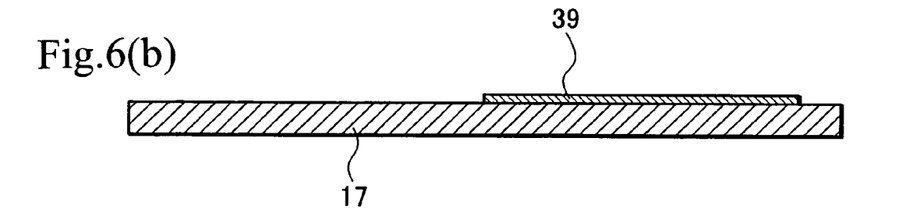

The high-conductivity ground layer forming process (b) of FIG. 5 carries out a copper plating process to form the high-conductivity ground layer 39 only on the write (record) side of the substrate 17 as shown in FIG. 6(b).

Figure 6C:
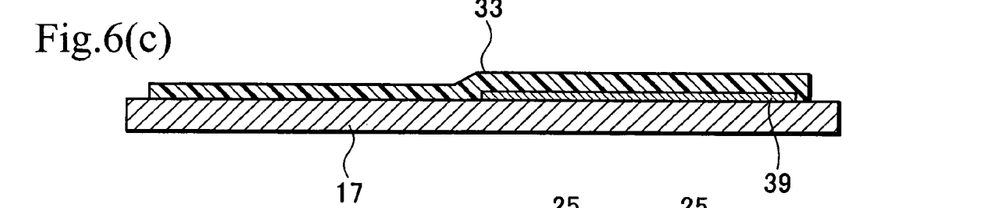

The base insulating layer forming process (c) of FIG. 5 forms the base insulating layer 33 from a polyimide insulating film having a thickness of 5 to 20 μm as shown in FIG. 6(c).

Figure 6D:
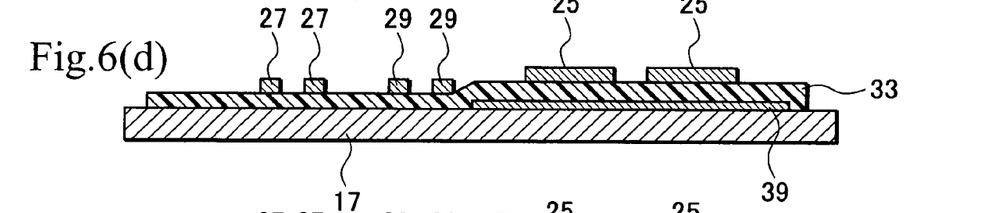

The wiring forming process (d) of FIG. 5 uses a resist mask to etch a Cu film into the wires 25, 27, and 29 as shown in FIG. 6(d).

Figure 6E:
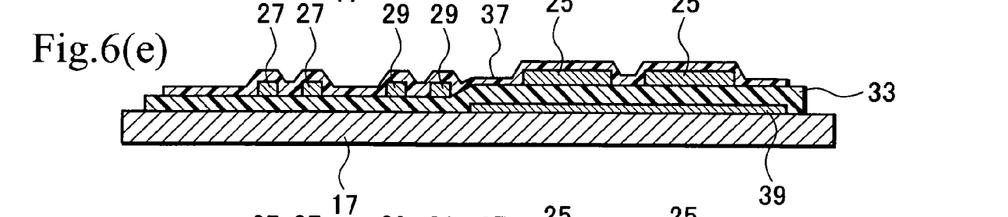

The cover insulating layer forming process (e) of FIG. 5 forms the cover insulating layer 37 from a polyimide insulating film having a thickness of 5 to 20 μm over the wires 25, 27, and 29 as shown in FIG. 6(e).

Figure 6F:
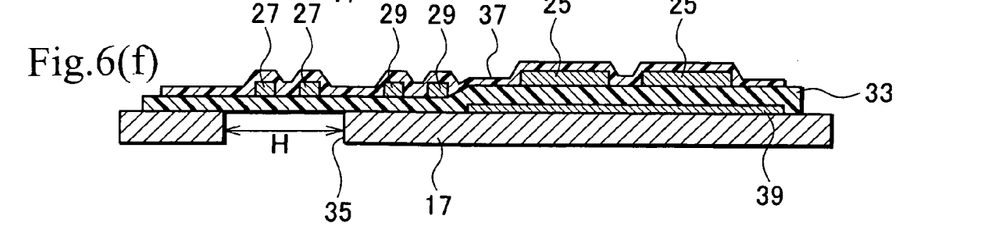

The window forming process (f) of FIG. 5 forms the window 35 having a width H by, for example, etching through the substrate 17 under the read wires 27 as shown in FIG. 6(f).

The window forming process (f) of FIG. 5 is carried out when the window 35 is needed and may be omitted if the window 35 is not needed.

These processes are included in the method of manufacturing the flexure 7 with a multilayer ground. A method of manufacturing the head suspension 1 with a multilayer ground contains the method of manufacturing the flexure 7 with a multilayer ground.

Figure 7:
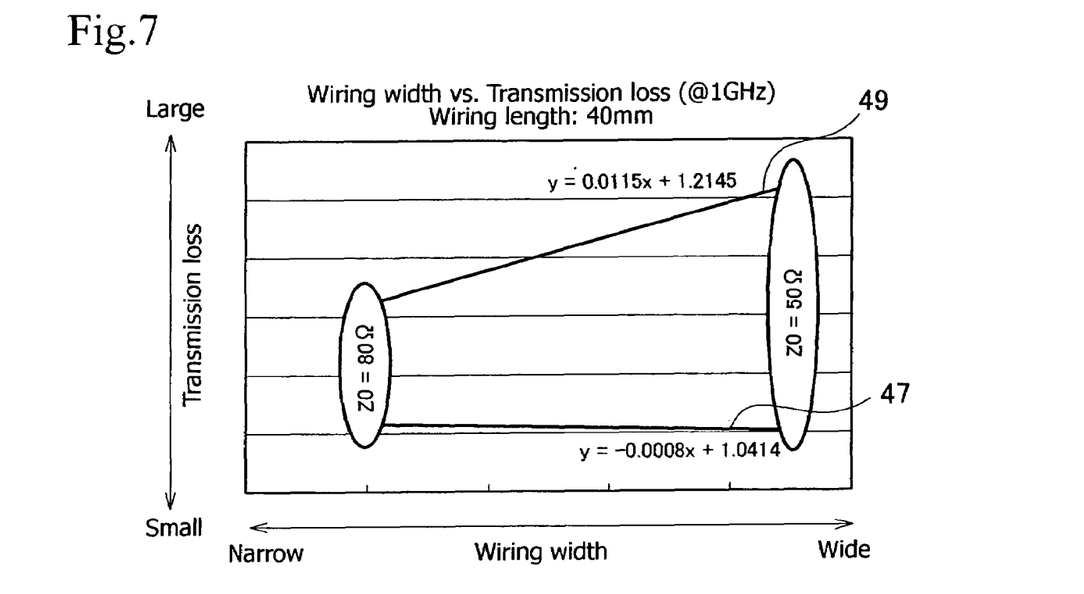
FIG. 7 is a graph showing wiring width-transmission loss characteristics of flexures according to the first embodiment and a comparative example.
Figure 8:
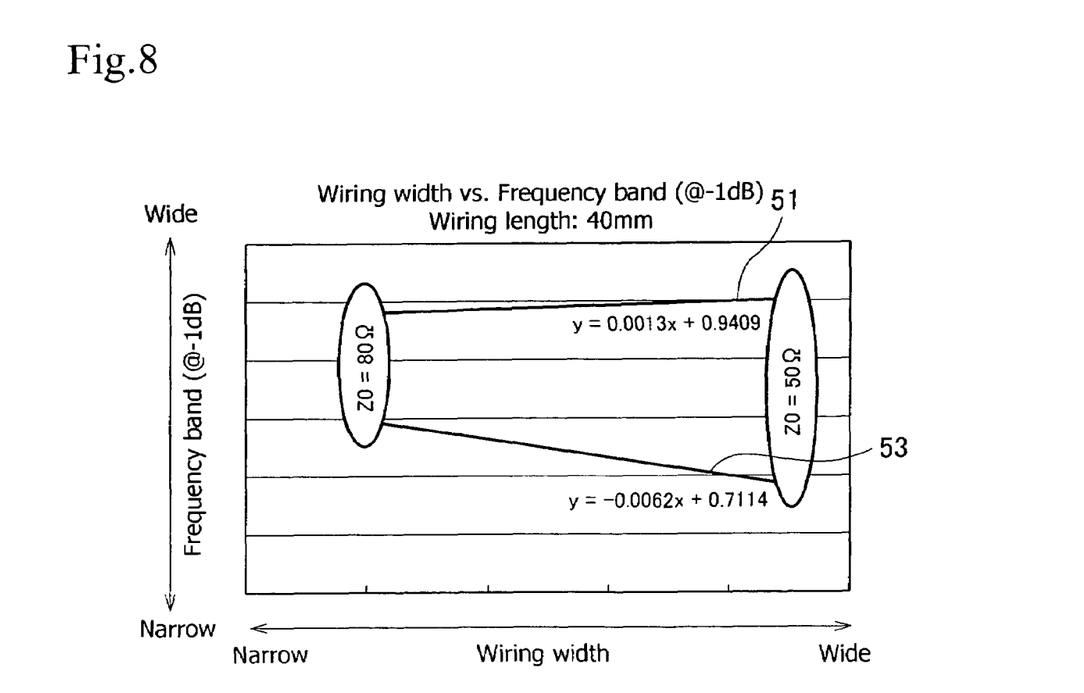
FIG. 8 is a graph showing wiring width-frequency band characteristics of flexures according to the first embodiment and a comparative example.

FIG. 7 is a graph showing wiring width-transmission loss characteristics of flexures according to the first embodiment and a comparative example and FIG. 8 is a graph showing wiring width-frequency band characteristics of flexures according to the first embodiment and a comparative example. An abscissa in each of FIGS. 7 and 8 indicates a wiring width. An ordinate in FIG. 7 indicates a transmission loss, and an ordinate in FIG. 8 indicates a frequency band. In each case, a wiring length is 40 mm.

In FIG. 7, a segment 47 represents the first embodiment with the ground layer 39 arranged only for write wiring and a segment 49 represents the comparative example without the ground layer 39. As is apparent from FIG. 7, the segment 49 without the ground layer 39 involves a larger transmission loss and increases the loss in proportion to an increase in the wiring width and the segment 47 with the ground layer 39 only for write wiring involves a smaller transmission loss and no increase in the loss according to an increase in the wiring width. Rather, the segment 47 with the ground layer 39 shows a slight decrease in the loss according to an increase in the wiring width.

In FIG. 8, a segment 51 represents the first embodiment with the ground layer 39 arranged only for write wiring and a segment 53 represents the comparative example without the ground layer 39. Changes in the wiring width and frequency band shown in FIG. 8 are those at a transmission loss of about 10%. As is apparent from FIG. 8, the segment 53 without the ground layer 39 involves a narrower frequency band and narrows the frequency band in proportion to an increase in the wiring width and the segment 51 with the ground layer 39 involves a wider frequency band and shows no decrease in the frequency band according to an increase in the wiring width. Rather, the segment 51 with the ground layer 39 shows a slight increase in the frequency band according to an increase in the wiring width.

In this way, the transmission loss and frequency band of the flexure with the ground layer 39 arranged only for write wiring according to the first embodiment are substantially not affected by a wiring width. Compared with the flexure having no ground layer 39, the flexure with the ground layer 39 can reduce the loss 30% to 50% lower and increase the frequency band 60% to 170% higher.

Figure 9:
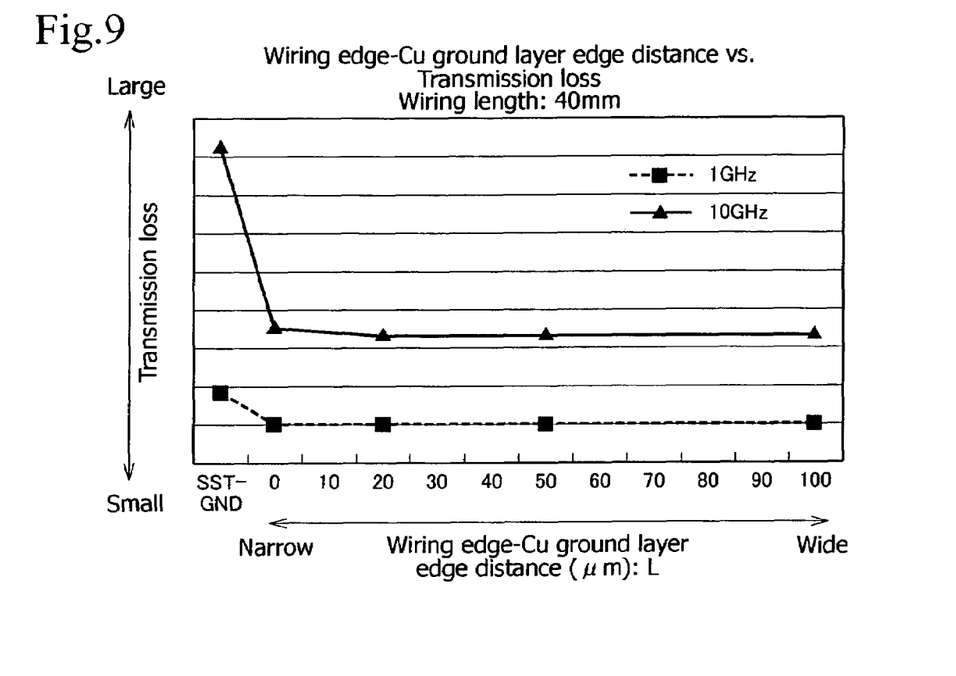
FIG. 9 is a graph showing edge distance-transmission loss characteristics of flexures according to the first embodiment and a comparative example.
Figure 10:
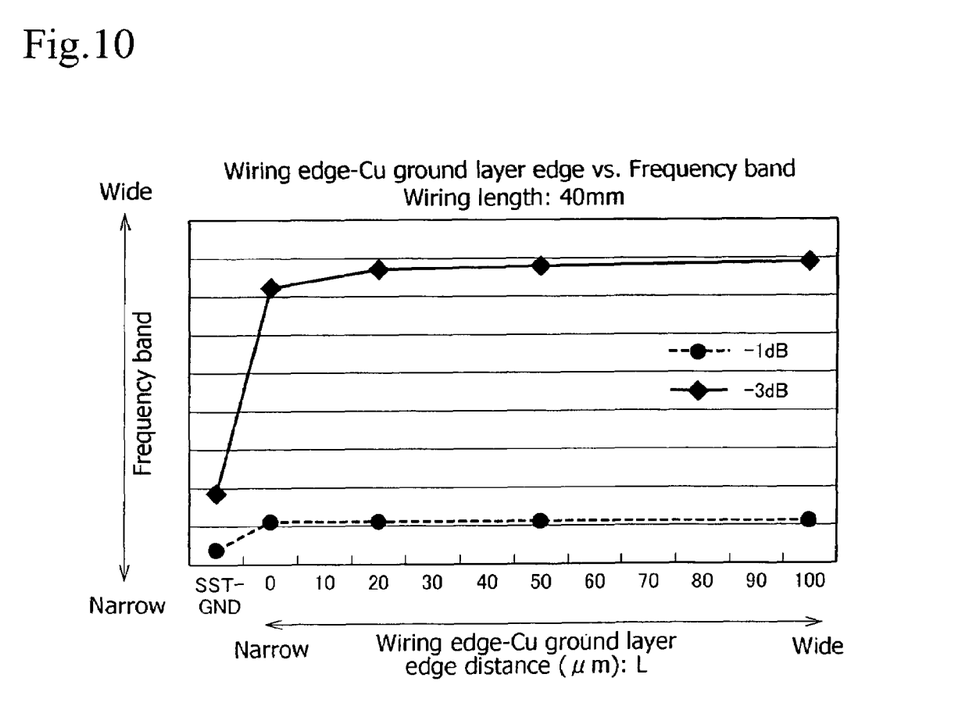
FIG. 10 is a graph showing edge distance-frequency band characteristics of flexures according to the first embodiment and a comparative example.

FIG. 9 is a graph showing edge distance-transmission loss characteristics of flexures according to the first embodiment and a comparative example and FIG. 10 is a graph showing edge distance-frequency band characteristics of flexures according to the first embodiment and a comparative example. An abscissa in each of FIGS. 9 and 10 indicates the edge-to-edge distance L (FIG. 3). An ordinate in FIG. 9 indicates a transmission loss and an ordinate in FIG. 10 indicates a frequency band. A wiring length is 40 mm.

A leftmost point in each graph of FIGS. 9 and 10 represents the comparative example without the ground layer 39. The comparative example at the leftmost point involves a larger transmission loss and a narrower frequency band. Compared with the comparative example without the ground layer 39, the first embodiment with the ground layer 39 shows a lower transmission loss and a wider frequency band. The lower transmission loss and wider frequency band can be obtained from the distance L=0 onward.

Figure 11:
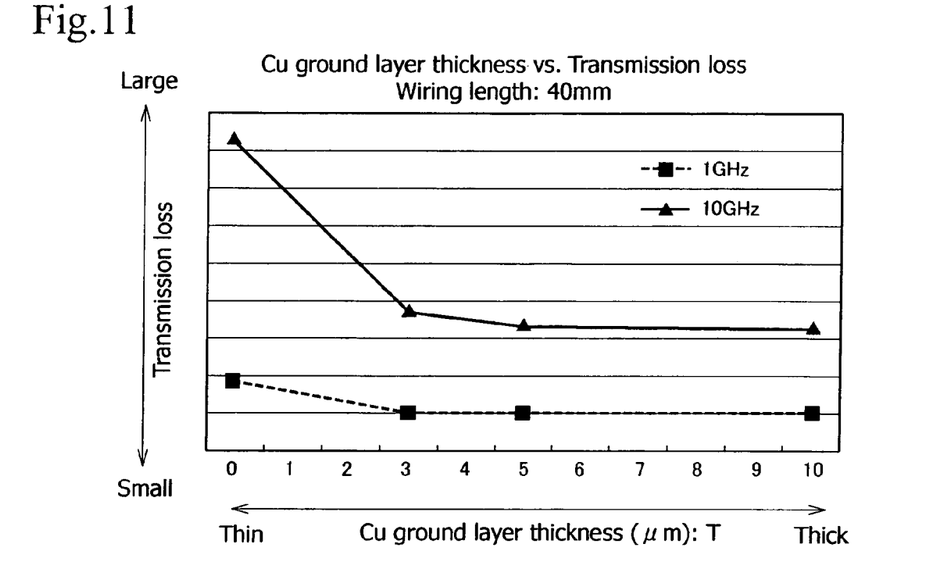
FIG. 11 is a graph showing ground thickness-transmission loss characteristics of flexures according to the first embodiment and a comparative example.
Figure 12:
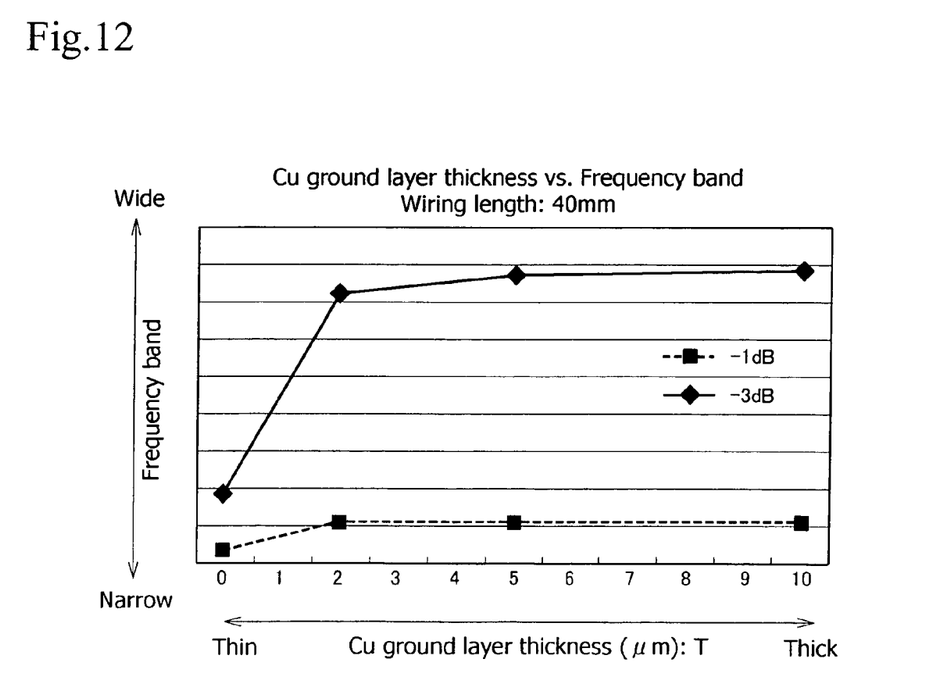
FIG. 12 is a graph showing ground thickness-frequency band characteristics of flexures according to the first embodiment and a comparative example.

FIG. 11 is a graph showing ground thickness-transmission loss characteristics of flexures according to the first embodiment and a comparative example and FIG. 12 is a graph showing ground thickness-frequency band characteristics of flexures according to the first embodiment and a comparative example. An abscissa in each of FIGS. 11 and 12 indicates the thickness T of the ground layer 39. An ordinate in FIG. 11 indicates a transmission loss and an ordinate in FIG. 12 indicates a frequency band. A wiring length is 40 mm.

A leftmost point in each graph of FIGS. 11 and 12 represents the comparative example without the ground layer 39. The comparative example at the left most point involves a larger transmission loss and a narrower frequency band. Compared with the comparative example without the ground layer 39, the first embodiment with the ground layer 39 shows a lower transmission loss and a wider frequency band. The lower transmission loss and wider frequency band can be obtained from the thickness T=3 μm or thicker.

Figure 13:
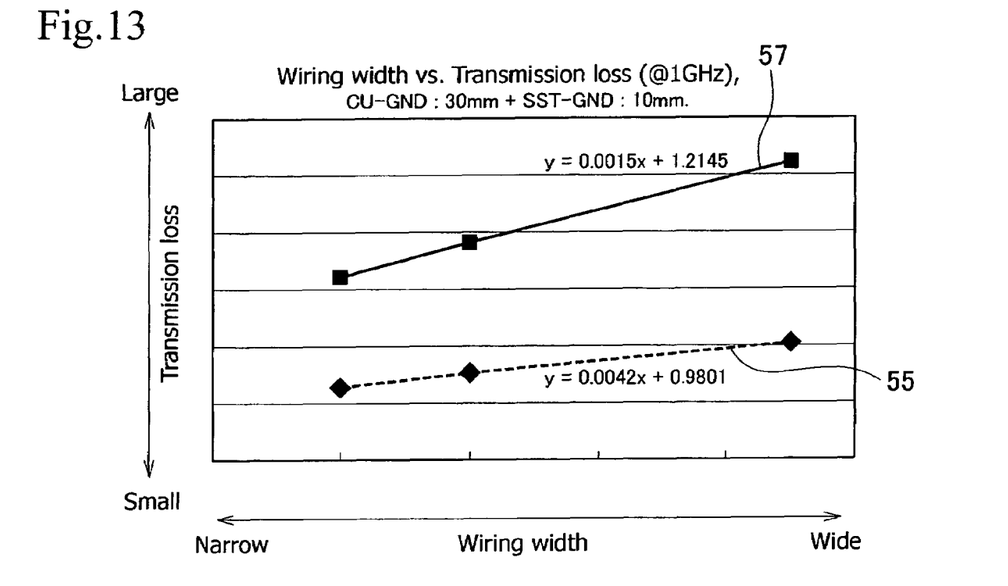
FIG. 13 is a graph showing wiring width-transmission loss characteristics of flexures according to the first embodiment and a comparative example.
Figure 14:
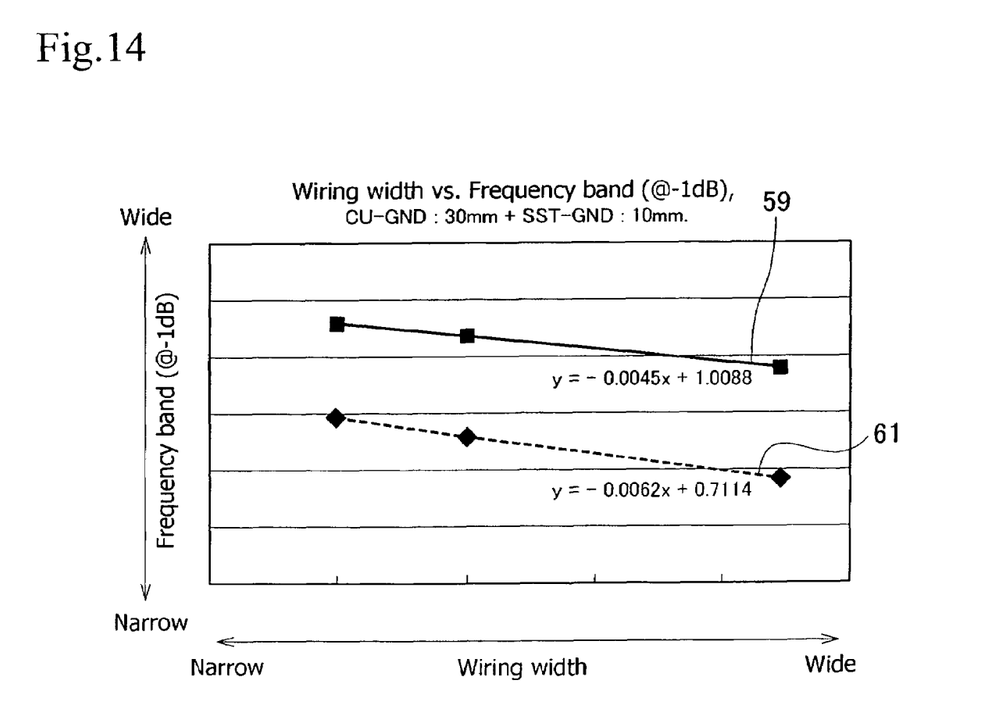
FIG. 14 is a graph showing wiring width-frequency band characteristics of flexures according to the first embodiment and a comparative example.

FIG. 13 is a graph showing wiring width-transmission loss characteristics of flexures according to the first embodiment and a comparative example and FIG. 14 is a graph showing wiring width-frequency band characteristics of flexures according to the first embodiment and a comparative example. An abscissa in each of FIGS. 13 and 14 indicates a wiring width. An ordinate in FIG. 13 indicates a transmission loss and an ordinate in FIG. 14 indicates a frequency band. A wiring length is 40 mm. The ground layer 39 is formed for a tail part of 30 mm of the 40-mm write wiring and the remaining 10 mm of the 40-mm write wiring is provided with grounding by the stainless-steel substrate 17.

In FIG. 13, a segment 55 represents the first embodiment with the ground layer 39 arranged only for the 30-mm tail part of the write wiring and a segment 57 represents the comparative example without the ground layer 39. As is apparent from FIG. 13, the segment 57 without the ground layer 39 involves a larger transmission loss and increases the loss in proportion to an increase in the wiring width and the segment 55 with the ground layer 39 only for the write wiring involves a smaller transmission loss and little increase in the loss according to an increase in the wiring width.

In FIG. 14, a segment 59 represents the first embodiment with the ground layer 39 arranged only for the 30-mm tail part of the write wiring and a segment 61 represents the comparative example without the ground layer 39. Changes in the wiring width and frequency band shown in FIG. 14 are those at a transmission loss of about 10%. As is apparent from FIG. 14, the segment 61 without the ground layer 39 involves a narrower frequency band and narrows the frequency band in proportion to an increase in the wiring width and the segment 59 with the ground layer 39 arranged only for the write wiring involves a wider frequency band. A change in the frequency band due to an increase in the wiring width of the first embodiment having the ground layer 39 is similar to that of the comparative example without the ground layer 39.

The transmission loss and frequency band of the flexure with the ground layer 39 arranged for a part of the total length of write wiring according to the first embodiment may change depending on the wiring width. However, compared with the flexure without the ground layer 39, the flexure with the ground layer 39 can reduce the transmission loss 30% to 40% lower and increase the frequency band 50% to 100% higher.

As mentioned above, the head suspension 1 according to the first embodiment includes the load beam 3 to apply load onto the head 21 that writes and reads information to and from a hard disk and the flexure 7 attached to the load beam 3 and supporting the head 21. The flexure 7 has the write wires 25 and read wires 27 connected to the head 21. The flexure 7 includes the substrate 17 made of a conductive thin plate, the base insulating layer 33 made of flexible resin, and the wires 25 and 27 arranged on the base insulating layer 33. The ground layer 39 is formed at least partly between the substrate 17 and the base insulating layer 33. The ground layer 39 only corresponds to the write wires 25 in a width direction of the flexure 7. The conductivity of the ground layer 39 is higher than that of the substrate 17 that is made of a conductive thin plate. The ground layer 39 can reduce the impedance of the write wires 25 by 40 to 50Ω, decrease the transmission loss thereof, and expand the frequency band thereof. In addition, the first embodiment can increase the impedance of the read wires 27 by 100Ω or more, decrease the transmission loss thereof, and expand the frequency band thereof.

Due to the above-mentioned effect, the head suspension according to the first embodiment is applicable to a wide variety of magnetic heads and preamplifiers. The ground layer 39 made of a material of high conductivity such as copper can reduce noise at a front end of the head suspension where the wires and preamplifier are arranged.

The ground layer 39 is formed so that the width of the ground layer 39 exceeds the width of the write wires 25. This configuration is effective to reduce the impedance and transmission loss of the write wires 25, expand the frequency band of the write wires 25, increase the impedance of the read wires 27, decrease the transmission loss of the read wires 27, and widen the frequency band of the read wires 27.

The ground layer 39 is formed in an area not to affect the movement characteristic of the head 21 with respect to a hard disk. More precisely, the ground layer 39 is not formed in the zone 41 around the resilient part 11 that resiliently supports the load beam 3 with respect to the base 5 and in a zone around the outrigger 43 of the flexure 7. This configuration prevents the ground layer 39 from affecting the floating characteristic and the like of the head 21 with respect to a hard disk.

The ground layer 39 has a thickness of at least 3 μm, to surely reduce the impedance and transmission loss of the write wires 25, expand the frequency band of the write wires 25, increase the impedance of the read wires 27, decrease the transmission loss of the read wires 27, and widen the frequency band of the read wires 27.

Figure 15:
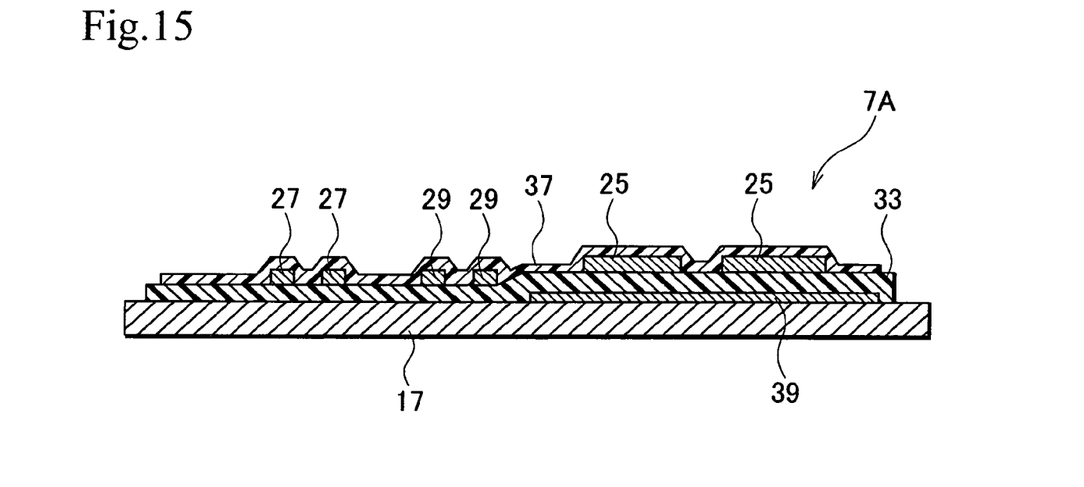
FIG. 15 is a sectional view showing a flexure with a multilayer ground for a head suspension according to a second embodiment of the present invention.

FIG. 15 is a sectional view showing a flexure with a multilayer ground for a head suspension according to the second embodiment of the present invention. A basic structure of the second embodiment is the same as that of the first embodiment, and therefore, the same or corresponding parts of the second embodiment are represented with the same reference numerals as those of the first embodiment or the same reference numerals plus "A."

The flexure 7A according to the second embodiment has a substrate 17 without a window.

A high-conductivity ground layer 39 is also formed only on the write side of the flexure 7A. Compared with the first embodiment with the window 35, the impedance of the read side of the flexure 7A is lower. However, the impedance of the read side of the flexure 7A is higher than the comparative example that forms a copper ground layer on the read side as well. Like the first embodiment, the second embodiment can reduce the impedance and transmission loss of write wires 25, expand the frequency band of the write wires 25, increase the impedance of read wires 27, decrease the transmission loss of the read wires 27, and widen the frequency band of the read wires 27.

Figure 16:
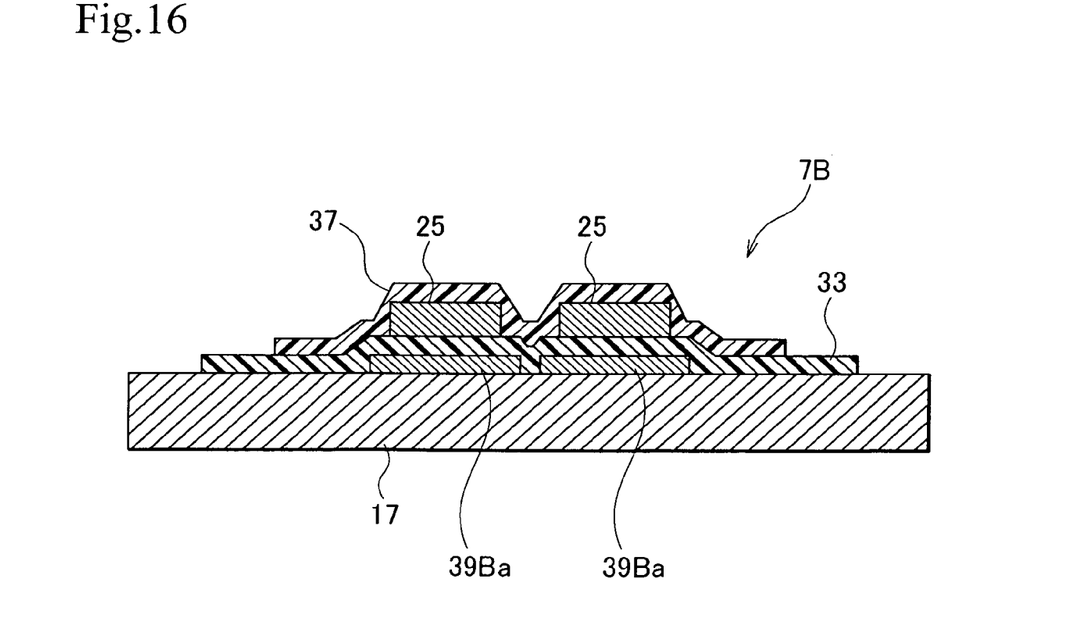
FIG. 16 is a sectional view showing the write side of a flexure with a multilayer ground for a head suspension according to a third embodiment of the present invention.

FIG. 16 is a sectional view showing a write side of a flexure with a multilayer ground for a head suspension according to the third embodiment of the present invention. A basic structure of the third embodiment is the same as that of the first embodiment, and therefore, the same or corresponding parts of the third embodiment are represented with the same reference numerals as those of the first embodiment or the same reference numerals plus "B."

The flexure 7B of the third embodiment forms separated high-conductivity ground layers 39Ba and 39Bb for write wires 25, respectively. It is preferable that the width of each of the ground layers 39Ba and 39Bb is larger than the width of the corresponding write wire 25. The ground layers 39Ba and 39Bb are effective to reduce the impedance and transmission loss of the write side and increase the frequency band thereof. The width of each of the ground layers may be same as that of the corresponding write wire 25.

Like the first embodiment, the third embodiment can reduce the impedance and transmission loss of the write wires 25, expand the frequency band of the write wires 25, increase the impedance of read wires 27, decrease the transmission loss of the read wires 27, and widen the frequency band of the read wires 27.

Figure 17:
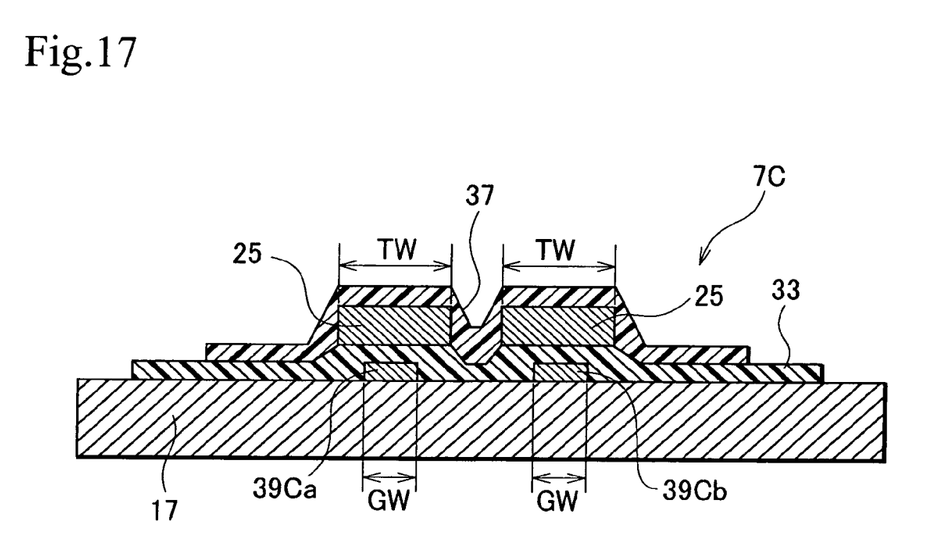
FIG. 17 is a sectional view showing the write side of a flexure with a multilayer ground for a head suspension according to a fourth embodiment of the present invention.

FIG. 17 is a sectional view showing a write side of a flexure with a multilayer ground for a head suspension according to the fourth embodiment of the present invention. A basic structure of the fourth embodiment is the same as that of the third embodiment, and therefore, the same or corresponding parts of the fourth embodiment are represented with the same reference numerals as those of the third embodiment or the same reference numerals plus "C" instead of "B."

The flexure 7C of the fourth embodiment also forms separated high-conductivity ground layers 39Ca and 39Cb for write wires 25, respectively. A width GW of each of the ground layers 39Ca and 39Cb is smaller than a width TW of each of the write wires 25. It is preferable that the width GW is 15 or more % of the width TW.

The ground layers 39Ca and 39Cb are effective to reduce the impedance and transmission loss of the write side and increase the frequency band thereof. Like the third embodiment, the fourth embodiment can reduce the impedance and transmission loss of the write wires 25, expand the frequency band of the write wires 25, increase the impedance of read wires 27, decrease the transmission loss of the read wires 27, and widen the frequency band of the read wires 27.

Figure 18:
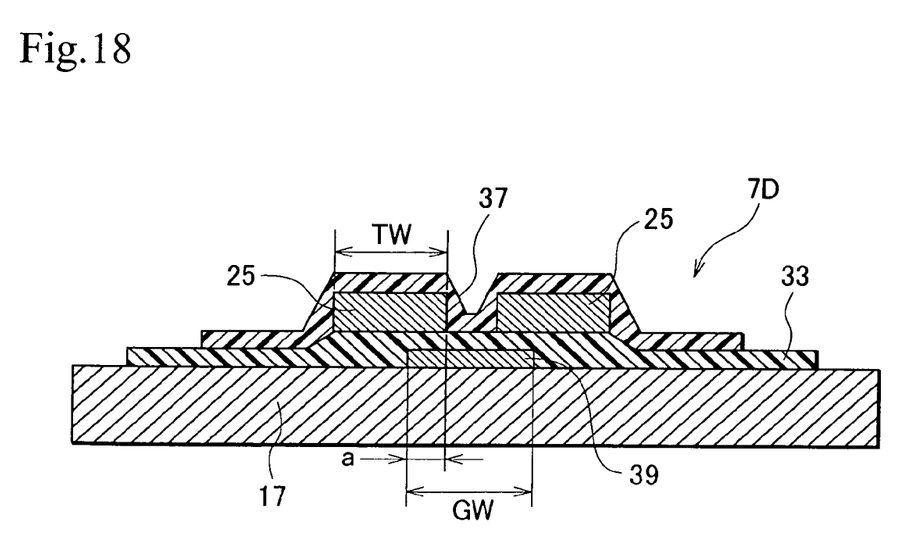
FIG. 18 is a sectional view showing the write side of a flexure with a multilayer ground for a head suspension according to a fifth embodiment of the present invention.

FIG. 18 is a sectional view showing a write side of a flexure with a multilayer ground for a head suspension according to the fifth embodiment of the present invention. A basic structure of the fifth embodiment is the same as that of the first embodiment, and therefore, the same or corresponding parts of the fifth embodiment are represented with the same reference numerals as those of the first embodiment or the same reference numerals plus "D."

The flexure 7D of the fifth embodiment forms a high-conductivity ground layer 39D between write wires 25, to partly overlap the write wires 25. An overlapping width "a" of the ground layer 39D on the write wire 25 is equal to or larger than 15% of a width TW of the write wire 25 ($a \geq 0.15TW$).

If the condition of "$a \geq 0.15TW$" is satisfied, the ground layer 39D is not always required to be extended over the gap between the write wires 25.

The ground layer 39D is effective to reduce the impedance and transmission loss of the write side and increase the frequency band thereof. Like the first embodiment, the fifth embodiment can reduce the impedance and transmission loss of the write wires 25, expand the frequency band of the write wires 25, increase the impedance of read wires 27, decrease the transmission loss of the read wires 27, and widen the frequency band of the read wires 27.

In each embodiment, the write wiring may include a single or a plurality of write wires 25.

What is claimed is:

1. A head suspension with a multilayer ground for a hard disk, comprising:
    a load beam configured to apply load onto a head which writes and reads information to and from the hard disk;
    a flexure attached to the load beam and supporting the head, the flexure including a substrate made of a conductive plate, a base insulating layer made of flexible resin and formed on the substrate, and write and read wiring arranged on the base insulating layer and connected to the head; and
    a ground layer having a higher conductivity than the substrate and formed between the substrate and the base insulating layer only on the write wiring side of the width of the flexure in a thickness direction thereof.

2. The head suspension of claim 1, wherein:
    the ground layer is made of copper.

3. The head suspension of claim 1, wherein:
    the width of the ground layer is larger than the width of the write wiring.

4. The head suspension of claim 1, wherein:
    the width of the ground layer is in a range between 15% of the width of the write wiring and the width of the write wiring.

5. The head suspension of claim 1, wherein:
    the write wiring includes a plurality of write wires and the ground layer is separated for each of the write wires.

6. The head suspension of claim 1, wherein:
    the ground layer overlaps at least 15% of the width of the write wiring.

7. The head suspension of claim 1, wherein:
    the ground layer is formed in an area not to affect the movement characteristic of the head with respect to the hard disk.

8. The head suspension of claim 7, wherein:
    the area not to affect the movement characteristic of the head excludes a zone around a resilient part that resiliently connects the load beam to a base and a zone around an outrigger of the flexure.

9. The head suspension of claim 1, wherein:
    the ground layer has a thickness equal to or larger than 3 μm.

10. A method of manufacturing a head suspension with a multilayer ground for a hard disk, the head suspension having a load beam configured to apply load onto a head which writes and reads information to and from the hard disk, a flexure attached to the load beam and supporting the head, the flexure including a substrate made of a conductive plate, a base insulating layer made of flexible resin and formed on the substrate, and write and read wiring arranged on the base insulating layer and connected to the head, and a ground layer having a higher conductivity than the substrate and formed between the substrate and the base insulating layer only on the write wiring side of the width of the flexure in a thickness direction thereof, the method comprising:
    forming the ground layer only on the write wiring side of the substrate by plating;
    forming the base insulating layer on the substrate and ground layer;
    forming the write and read wiring on the base insulating layer; and
    forming a cover insulating layer over the wiring.

11. The method of claim 10, further comprising:
    forming a window in the substrate at a location corresponding to the read wiring.

12. A flexure with a multilayer ground for a head suspension of a hard disk, the flexure being attached to a load beam that applies load onto a head which writes and reads information to and from the hard disk, supporting the head, and including a substrate made of a conductive plate, a base insulating layer made of flexible resin and formed on the substrate, and write and read wiring arranged on the base insulating layer and connected to the head in a thickness direction thereof, the flexure comprising:
    a ground layer having a higher conductivity than the substrate and formed between the substrate and the base insulating layer only on the write wiring side of the width of the flexure.

13. A method of manufacturing a flexure with a multilayer ground for a head suspension of a hard disk, the flexure being attached to a load beam that applies load onto a head which writes and reads information to and from the hard disk, supporting the head, and including a substrate made of a conductive plate, a base insulating layer made of flexible resin and formed on the substrate, write and read wiring arranged on the base insulating layer and connected to the head, and a ground layer having a higher conductivity than the substrate and formed between the substrate and the base insulating layer only on the write wiring side of the width of the flexure in a thickness direction thereof, the method comprising:
    forming the ground layer only on the write wiring side of the substrate by plating;
    forming the base insulating layer on the substrate and ground layer;
    forming the write and read wiring on the base insulating layer; and
    forming a cover insulating layer over the wiring.

14. The method of claim 13, further comprising:
    forming a window in the substrate at a location corresponding to the read wiring.

* * * * *